Feb. 10, 1953     P. A. DAHLSTEDT     2,628,023
REGULATION OF THE FAT CONTENT OF MILK PRODUCTS
Filed April 5, 1949
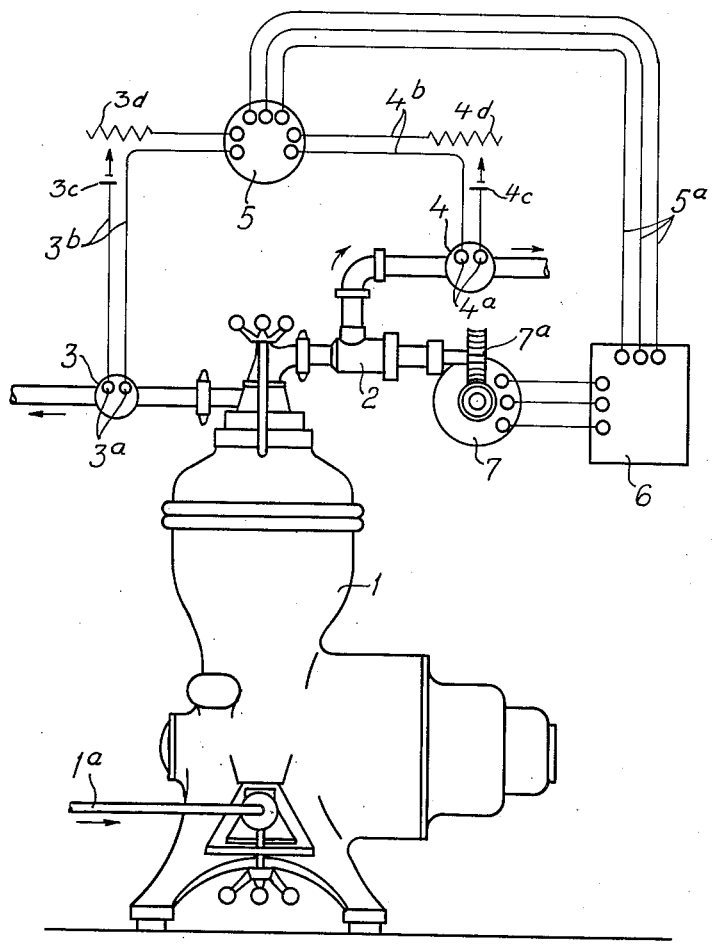
INVENTOR.
Per Åke Dahlstedt
BY
Davis, Hoxie & Faithfull Patented Feb. 10, 1953

2,628,023

UNITED STATES PATENT OFFICE 2,628,023

REGULATION OF THE FAT CONTENT OF MILK PRODUCTS

Per Ake Dahlstedt, Grondal, Sweden, assignor to Aktiebolaget Separator, Stockholm, Sweden, a corporation of Sweden Application April 5, 1949, Serial No. 85,520
In Sweden April 5, 1948

2 Claims. (Cl. 233—19)

This invention relates to the regulation of the fat content of milk products, and more particularly to an improved method and apparatus for this purpose.

In the continuous production of butter, it is common practice to concentrate the fat content of whole milk, in one or more centrifuging steps, into cream having a fat percentage equal to that of the final butter. It is important to be able to regulate the fat content continuously, and preferably automatically, during the concentrating operation. It is known in the art to measure the electrical resistance or the dielectric constant of the cream to determine its fat content. However, the dielectric constant is dependent not only upon the fat content but also upon other factors such as, for example, the nature of the milk serum contained in the cream. It is therefore impossible to obtain an accurate determination of the fat content by direct measurement of the electrical resistance of the cream as described above.

The present invention has for its principal object the provision of an improved method and apparatus by which, in the continuous production of cream by centrifugal separation, the fat content of the cream can be determined and regulated electrically with greater accuracy than has been possible heretofore.

According to the present invention, the fat content is determined by measuring simultaneously the electrical resistance of the cream flow and the electrical resistance of the corresponding skim milk flow from the centrifugal separator. When concentrating cream, a corresponding amount of skim milk is always obtained, and this discharges from the centrifuge at the same time as the cream. By measuring the electrical resistances of the separate streams of cream and skim milk flowing from the separator and comparing the respective resistance values, or subtracting one from the other, a resulting value is obtained which is a measure of the fat content of the cream.

The resistance or the dielectric constant may be measured by passing an electric current through the liquid flow between two electrodes. The cream or the skim milk may, for example, be passed through a container provided with parallel walls of insulating material to which the electrodes are fixed. One such container must then be arranged in the milk pipe and another in the cream pipe leading from the separator. Cream and skim milk will thus flow continuously through the respective containers where at any given instant they will constitute components of the same whole milk.

In the production of butter according to the above method, it is customary to separate in a first centrifuge skim milk and cream of a moderate concentration, for example, 30–40%. The cream is then concentrated in a second centrifuge to a fat content of 80% or slightly more, corresponding to the fat content of the butter to be produced. According to the invention, the fat content in one or both centrifuges may now be determined in the described manner and the corresponding centrifuge or centrifuges regulated according to such determination to maintain the desired fat content. The electrical measuring devices together act as a fat content indicator, which may be utilized for reading the fat content of the cream and regulating the centrifuge manually as indicated by the readings, or regulating it by means of an automatic device, with a view to maintaining a constant predetermined value of the fat content. The most convenient method of achieving this is generally to regulate only the last stage centrifuge or centrifuges.

It will be understood that the invention is not limited to the production of butter in the above described manner but may be used in cream separation in general, as well as in standardizing of milk.

The accompanying drawing is a schematic view of an apparatus according to the invention for practicing the new process.

The whole milk or cream is fed from below through a pipe $1a$ into a centrifugal separator $1$, in which it is separated into relatively low or relatively high fat content cream, respectively, which discharges through a measuring cell $4$, and skim milk which discharges through a measuring cell $3$. The cells $3$ and $4$ may be of any conventional type for measuring the electrical resistance of a liquid stream flowing through the cell. The cells each contain the usual electrodes connected to a suitable current source (not shown) and between which the stream flows. Any increase in the electrical resistance of the skim milk stream or the cream stream will cause a voltage drop across the terminals $3a$ or $4a$ of the cell $3$ or $4$, respectively. The terminals $3a$ and $4a$ are connected by wiring $3b$ and $4b$ through sources of electric potential $3c$ and $4c$, respectively, to a device $5$ which is preferably an electrical indicator of the type adapted to measure the difference between two opposing electrical potentials, at least to the extent of responding to the greater of the two potentials. That is, in the measuring device $5$ the electrical potential across the terminals 4a is applied against the opposing electrical potential across terminals 3a, so that the device 5 responds in either of two ways depending upon which of the two potentials is the greater. The indicator 5 may be of any conventional type operating in the manner described, such as a dual coil microammeter, for example, a G. E. model AAA-71. The magnitude and direction of the net electrical potential is a measure of the fat content of the cream flowing through cell 4. The indicator 5 is connected through wiring 5a and a relay 6 to a control device comprising a reversible electric motor 7 and a fat content regulator 2. The latter, which may be of the type disclosed in C. H. Hapgood Patent No. 2,145,544, includes simply a throttling valve in the cream discharge path from the centrifuge, and an adjustment shaft adapted to be rotated by the motor 7 through gear wheel 7a to vary the resistance imposed by the throttling valve to outflow of the separated cream.

As long as the fat content of the cream discharging through cell 4 is at the desired value, the motor 7 is deenergized so that there will be no adjustment of the fat content regulator 2. Any change in the electrical conductivity of the milk serum in the product fed to the centrifuge will not cause a false regulation by the regulator 2 because part of the milk serum flows through the cream cell 4 and the remainder through the skim-milk cell 3. The resulting change in the electrical potential across terminals 4a will thus be compensated by the resulting change in the opposing electrical potential across terminals 3a, so that the net potential in the device 5 does not change, or at least does not change sufficiently to energize the motor 7 through relay 6. However, if the fat content of the cream flowing through cell 4 becomes too low, the electrical potential across the terminals 4a increases relative to the potential across the terminals 3a, so that the net potential in the measuring device 5 changes in a direction such that the regulator 2 is adjusted through the relay 6 and motor 7 to increase the flow resistance or throttling effect on the cream, thereby increasing the fat content of the cream discharging from the centrifuge. If the fat content exceeds the desired value, the net potential in the measuring device 5 changes in the opposite direction and consequently operates the regulator 2 through the relay and the reversible motor to decrease the throttling effect on the cream, thereby decreasing the fat content.

The measuring device 5 or the relay 6 is preferably provided with adjustable biasing means, such as a rheostat, whereby the net electrical potential in the device 5 at which the motor 7 remains deenergized can be varied. For example, the circuits of the cells 3 and 4 may include adjustable resistors 3d and 4d for this purpose. In this way, the fat content of the outflowing cream can be adjusted to different values. Alternatively, the cream cell 4, for example, may be adjustable to vary the potential across terminals 4a independently of the fat content, to permit adjustment of the fat content maintained by the apparatus.

Assuming that a milk product (cream) having a fat content of 50% is fed into the centrifuge 1 through pipe 1a, and that concentrated cream having a desired fat content of 80% is discharged through cell 4, there will be a certain relation between the electrical resistances of the skim-milk and the cream as indicated by the cells 3 and 4, respectively, and this relation will constitute a predetermined standard for use in determining or controlling the fat content of the separated cream under these circumstances. By means of the cells 3 and 4 and the device 5, the electrical resistance values of corresponding portions of the skim-milk and cream streams, respectively, are measured and compared to determine their relative values with respect to this predetermined standard. For example, if the standard is represented by a zero net electrical potential in the device 5 (at which point the motor 7 is deenergized), and a positive net voltage should develop in the device 5 due to a decrease in the potential across terminals 4a relative to the potential across terminals 3a, it would indicate that the fat content of the separated cream has exceeded 80%; and the contrary would be indicated by a negative net voltage in the device 5. The device 5 could, of course, be provided with an indicator in the form of a pointer operating over a calibrated scale to show the fat content value at any instant, and the regulator 2 could be operated manually in accordance with indications given by the pointer.

The cells 3 and 4 serve to measure in sequence the electrical resistances of corresponding successive parts of the skim-milk and the cream streams, respectively, discharging through their pipe lines from the centrifuge; and the device 5 serves to determine the difference between the skim-milk and cream resistance values thus measured at each of the successive corresponding parts of the two streams. By adjustment of the regulator 2, either automatically as shown or manually, any variations of this difference from a predetermined standard are counteracted so as to maintain a substantially constant fat content of the discharging cream.

It will be understood that the differential measuring device 5 functions to compare the electrical potentials across the skim-milk and cream passing through the cells 3 and 4, respectively, and determines any substantial change in one potential relative to the other. Such change will be indicated by rotation of the gear wheel 7a. Thus, if the potential across the cell 4 increases relative to that across cell 3, the device 5 will act through relay 6 to rotate the gear 7a in one direction, and if the reverse condition arises, the gear will be rotated in the opposite direction. Accordingly, the movements of gear 7a serve in effect to provide a visual and prompt indication of an increase or a decrease in the fat content of the separated cream.

In the electrical art, systems performing the functions heretofore ascribed to the devices 5 and 6, to operate the motor 7 from the cells 3 and 4, are well known. Accordingly, the details of such a system need not be disclosed here. However, by way of example, the control system disclosed in U. S. Patent No. 2,228,078, granted to F. H. Gulliksen on January 7, 1941, may be used. In Fig. 5 of the Gulliksen patent, the control bridge 33 corresponds to the present device 5, the present resistance cells 3 and 4 replacing Gulliksen's photo-cells 36 and 37; Gulliksen's motor 7 corresponds to the present motor 7; and Gulliksen's network between his bridge 33 and motor 7 corresponds to the present wiring 5a and relay 6.

I claim:

1. In combination with a centrifugal cream separator having separate discharge lines for the cream and skim-milk, respectively, the combination of a cell in each of said lines for continuously measuring the electrical resistance of the discharge liquid flowing therethrough, a device connected to the cells for continuously indicating variations in the measured resistance value of the cream relative to the measured resistance value of the skim-milk, and a regulator operatively connected to said device for controlling the fat content of the cream discharging through the cream line.

2. In combination with a centrifugal cream separator having separate discharge lines for the cream and skim milk, respectively, the combination of an electric cell in each of said lines and through which discharging liquid in the line flows, an electrical circuit including one of said cells, a second electrical circuit including the other of said cells, whereby the electrical potential across each cell varies with the electrical resistance of the liquid flowing through the cell, and an indicating device included in both of said circuits for continuously comparing said potentials to indicate variations in the electrical resistance of the cream relative to the electrical resistance of the skim milk.

PER AKE DAHLSTEDT.

REFERENCES CITED

The following references are of record in the file of this patent:

UNITED STATES PATENTS

| Number | Name | Date |
| --- | --- | --- |
| 1,388,613 | Simsohn | Aug. 23, 1921 |
| 1,587,106 | Edelman | June 1, 1926 |
| 1,701,331 | Merrill | Feb. 5, 1929 |
| 2,144,229 | Ruds | Jan. 17, 1939 |
| 2,145,544 | Hapsgood | Jan. 31, 1939 |
| 2,174,169 | Risberg | Sept. 26, 1939 |
| 2,296,867 | Osborne | Sept. 29, 1942 |